(12) United States Patent
Friedrich et al.

(10) Patent No.: US 6,529,795 B1
(45) Date of Patent: Mar. 4, 2003

(54) NUMERICAL CONTROL FOR MACHINE-TOOLS, ROBOTS OR THE LIKE

(75) Inventors: Ralf Friedrich, Herzogenaurach (DE); Stefan Peschke, Dormagen (DE); Johannes Jennessen, Schwalmtal (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/462,655

(22) PCT Filed: Jun. 26, 1998

(86) PCT No.: PCT/DE98/01769
§ 371 (c)(1), (2), (4) Date: Mar. 31, 2000

(87) PCT Pub. No.: WO99/03025
PCT Pub. Date: Jan. 21, 1999

(30) Foreign Application Priority Data

Jul. 11, 1997 (DE) .................................. 297 12 266 U

(51) Int. Cl.[7] .............................................. G06F 19/00
(52) U.S. Cl. ........................................ 700/186; 700/159
(58) Field of Search ........................ 700/186, 182–184, 700/191–193, 159

(56) References Cited

U.S. PATENT DOCUMENTS

| | | | | |
|---|---|---|---|---|
| 5,144,550 A | * | 9/1992 | Sasaki et al. | 700/87 |
| 5,289,382 A | * | 2/1994 | Goto | 700/179 |
| 5,453,933 A | * | 9/1995 | Wright et al. | 700/181 |
| 5,815,400 A | * | 9/1998 | Hirai et al. | 700/173 |
| 5,914,876 A | * | 6/1999 | Hirai | 700/87 |
| 6,202,003 B1 | * | 3/2001 | Niwa | 700/192 |

FOREIGN PATENT DOCUMENTS

DE 43 21 631 1/1995

OTHER PUBLICATIONS

Patent Abstracts of Japan, vol. 018, No. 235 (p–1732), Apr. 28, 1994 & JP 06 020206 A (Victor Co. of Japan Ltd.) Jan. 28, 1994.

* cited by examiner

*Primary Examiner*—Leo Picard
*Assistant Examiner*—Zoila E. Cabrera
(74) *Attorney, Agent, or Firm*—Staas & Halsey LLP

(57) ABSTRACT

By implementing a sequence control in a numerical control, tool-related machining operations and position elements are executed depending on the technology-dependent sequence in the machining program so that all cycles of a machining operation are selected consecutively as modal cycles, with all cycles being selected consecutively for a position element for each cycle for a machining operation, and the respective operation being executed at the position of the respective position element prior to the following cycle being selected as a modal cycle for an operation. Thus unnecessary tool changes are avoided and therefore machining productivity is increased.

13 Claims, 1 Drawing Sheet

NUMERICAL CONTROL FOR MACHINE-TOOLS, ROBOTS OR THE LIKE

FIELD OF THE INVENTION

The present invention relates to a numerical control for machine tools, robots, or the like that are controllable using a machining program with tool-related machining operations and position elements.

BACKGROUND OF THE INVENTION

In manufacturing individual parts and small series of workpieces using numerically controlled machine tools or robots, the programming sequence of a numerical control represents an important cost factor, since programming is performed by workshop-oriented programming predominantly on the machine tool, especially in small manufacturing shops. In this process, programming times and machine shutdown times add up to a considerable portion of the unit cost of the workpieces that are manufactured.

One considerable disadvantage of numerical controls and the respective programming languages used today is the block structure requirement according to DIN 66025, which assumes basic knowledge of the significance of G and M functions, but also requires mastery of the respective control dialect. Thus, the purchase of a numerically controlled machine tool or new generation robot involves not only costly training of an employee, but also training of a new specialist each time, whose function can only be assumed by other employees either only partially or not at all in his or her absence, since traditionally the control of a machining sequence is determined by the programmer at the time the program is written.

This traditional programming method is elucidated in the following with reference to an example.

FIG. 1 shows a workpiece W, to which different internal threads are to be applied. The machining steps will be hereinafter referred to as machining operations or machining objects; the positions will be referred to as position elements. Accordingly, the above-mentioned internal threads on position elements will be referred to as GO1 through GO4 and GO5 through GO8, each of which describes a row of holes with four holes aligned along a straight line.

A complete sequence of machining operations and positions describes a machining task. A sequence is completed if at least one position element follows at least one machining operation.

In order to make an internal thread using a machine tool according to FIG. 1, in principle the following machining steps must be executed:

1. Center with a centering bit
   at the positions of row of holes 1
   at the positions of row of holes 2
2. Bore with core bit
   at the positions of row of holes 1
   at the positions of row of holes 2
3. Cut thread with a thread cutter
   at the positions of row of holes 1
   at the positions of row of holes 2

Machining steps 1, 2, and 3 are therefore individual machining operations performed on the position elements.

Traditionally such tool-related machining is performed by writing a CNC program. In a CNC program, the machining operations are recalled in the form of modal cycles; then the position elements are defined in the form of positions (see previous example). Since the cycles are modal cycles, they are executed by the machine tool in each consecutive position as the machining program is run. A CNC machining program can be produced by the worker directly generating the program on the machine or via a post-processor run from a CAD/CAM program. The sequence control is therefore determined at the time the program is produced by the programmer or the CAD/CAM system.

Therefore, sequence control and thus the duration of the machining process is heavily dependent on the skill and experience of the programmer on the machine. Depending on the optimization of the machining operation concerning the machining program, this may also involve multiple changes of each tool.

SUMMARY

An object of the present invention is therefore to control the sequence of a machining task so that the given operations are performed on all position elements so that each tool is only changed once. In this manner, it is always ensured that the time per unit is optimized regardless of the skill of the programmer and therefore productivity is improved.

To achieve this object, the numerical programming according to the present invention provides that the numerical programming includes a sequence control by the use of cycles, according to which machining operations and position elements for each machining task can be performed in the machining program, depending on their technology-dependent sequence in the machining program, so that each cycle for an operation can be selected as a modal cycle, with all cycles for a position element being selected consecutively for a machining object and the respective operation being performed at the position of the respective position element before the following cycle is selected as a modal cycle for an operation.

In a first advantageous embodiment of the numerical control according to the present invention, a particularly effective implementation of the aforementioned sequence control is achieved in that a machining buffer is provided, in which the data of the respective machining object and position element can be written for each machining operation. This can be done, in particular, at the time when the machining program is running.

In another advantageous embodiment of the numerical control according to the present invention, the sequence control according to the present invention can be executed at the time of the program execution. This is done by the sequence control operating in real time mode at the time of the machining program execution. This can be done by interpreting the machining buffer and control according to the above-described sequence.

Another advantageous embodiment also facilitates the description of geometric structures in that position elements can also describe, in particular, position series, position grids, or position circles or obstacles.

In another advantageous embodiment of the numerical control according to the present invention, tool axis path optimization is also possible. This is achieved by the fact that return motions onto a global return plane during the cycle can be avoided by the sequence control for the position elements located at different levels in that return positioning is only performed up to a local safety level of the position element located at a higher level.

In another advantageous embodiment of the numerical control according to the present invention, a more effective implementation of the machining programs is also made possible. This is achieved by the fact that position elements can be used multiple times for different machining operations.

Further details and advantages of the present invention are presented with reference to advantageous embodiments illustrated in the figures. Elements having the same functions are denoted with the same symbols in the different figures.

DETAILED DESCRIPTION

Figure 1:
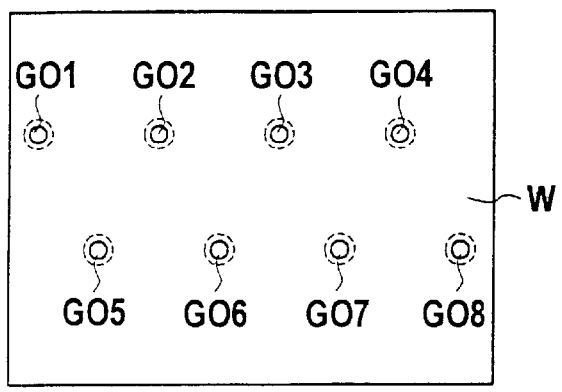
FIG. 1 shows the technological object of applying an get internal thread to a workpiece.

FIG. 1 has been explained above with reference to the traditional machining program executed there. Such an NC machining program using traditional technology is given in the following in the form of a basic sequence without using a specific syntax, since the syntax is different for different control manufacturers. For the technological task illustrated in FIG. 1 of applying internal threads to a workpiece W in the form of a first row of holes having positions 1 through 4, which represent positions GO1 through GO4, and a second row of holes having positions 1 through 4, which represent positions GO5 through GO8, the basic sequence of the NC program using traditional technology has the following aspect:

| N30 | Tool change, center bit |
|---|---|
| N40 | Centering cycle (modal) |
| N50 | 1$^{st}$ position 1$^{st}$ row of holes |
| N60 | 2$^{nd}$ position 1$^{st}$ row of holes |
| N70 | 3$^{rd}$ position 1$^{st}$ row of holes |
| N80 | 4$^{th}$ position 1$^{st}$ row of holes |
| N90 | 1$^{st}$ position 2$^{nd}$ row of holes |
| N100 | 2$^{nd}$ position 2$^{nd}$ row of holes |
| N110 | 3$^{rd}$ position 2$^{nd}$ row of holes |
| N120 | 4$^{th}$ position 2$^{nd}$ row of holes |
| N130 | Tool change, core bit |
| N140 | Hole boring cycle (modal) |
| N150 | 1$^{st}$ position 1$^{st}$ row of holes |
| N160 | 2$^{nd}$ position 1$^{st}$ row of holes |
| N170 | 3$^{rd}$ position 1$^{st}$ row of holes |
| N180 | 4$^{th}$ position 1$^{st}$ row of holes |
| N190 | 1$^{st}$ position 2$^{nd}$ row of holes |
| N200 | 2$^{nd}$ position 2$^{nd}$ row of holes |
| N210 | 3$^{rd}$ position 2$^{nd}$ row of holes |
| N220 | 4$^{th}$ position 2$^{nd}$ row of holes |
| N230 | Tool change, thread cutter |
| N240 | Thread cutting cycle (modal) |
| N250 | 1$^{st}$ position 1$^{st}$ row of holes |
| N260 | 2$^{nd}$ position 1$^{st}$ row of holes |
| N270 | 3$^{rd}$ position 1$^{st}$ row of holes |
| N280 | 4$^{st}$ position 1$^{st}$ row of holes |
| N290 | 1$^{st}$ position 2$^{nd}$ row of holes |
| N300 | 2$^{nd}$ position 2$^{nd}$ row of holes |
| N310 | 3$^{rd}$ position 2$^{nd}$ row of holes |
| N320 | 4$^{th}$ position 2$^{nd}$ row of holes |
| N330 | End modal cycle |

In order to avoid the need of describing positions more than one time, the positions can also be described in subprograms and then called:

| N30 | Tool change, center bit |
|---|---|
| N40 | Centering cycle (modal) |
| N50 | Call UP4711 |
| N60 | Tool change, core bit |
| N70 | Hole boring cycle (modal) |
| N80 | Call UP4711 |
| N90 | Tool change, thread cutter |
| N100 | Thread cutting cycle (modal) |
| N110 | Call UP4711 |
| N120 | End modal cycle |
| UP4711 | |
| N10 | 1$^{st}$ position 1$^{st}$ row of holes |
| N20 | 2$^{nd}$ position 1$^{st}$ row of holes |
| N30 | 3$^{rd}$ position 1$^{st}$ row of holes |
| N40 | 4$^{th}$ position 1$^{st}$ row of holes |
| N50 | 1$^{st}$ position 2$^{nd}$ row of holes |
| N60 | 2$^{nd}$ position 2$^{nd}$ row of holes |
| N70 | 3$^{rd}$ position 2$^{nd}$ row of holes |
| N80 | 4$^{th}$ position 2$^{nd}$ row of holes |

In addition to this traditional method, there is also the additional option of writing the sequence of a subprogram between two flags of the main program and calling it via these flags.

Using the present invention, it is now possible to execute each task, which in the example shown are the operations of centering, core hole boring, and thread cutting, by calling one cycle. Sequence control is not performed at the time the program is written, but at the time it is executed, i.e., in real time. For this purpose, an appropriate sequence control logic is implemented in the cycles of the numerical control, which controls the program sequence according to certain well-defined rules during program execution. These rules are written as follows for the machining task illustrated in FIG. 1:

| N20 | Cycle for centering |
|---|---|
| N30 | Cycle for hole boring |
| N40 | Cycle for thread cutting |
| N50 | Cycle for 1$^{st}$ position 1$^{st}$ row of holes |
| N60 | Cycle for 2$^{nd}$ position 1$^{st}$ row of holes |
| N70 | Cycle for 3$^{rd}$ position 1$^{st}$ row of holes |
| N80 | Cycle for 4$^{th}$ position 1$^{st}$ row of holes |
| N90 | Cycle for 1$^{st}$ position 2$^{nd}$ row of holes |
| N100 | Cycle for 2$^{nd}$ position 2$^{nd}$ row of holes |
| N110 | Cycle for 3$^{rd}$ position 2$^{nd}$ row of holes |
| N120 | Cycle for 4$^{th}$ position 2$^{nd}$ row of holes |

By moving the sequence control for a hole boring task or a cutting task, for example, into the cycles of the numerical control, the programmer is largely freed from managing the sequence. The fact that management is then performed by the logic of the numerical control provides further possibilities of automatic optimization by the numerical control, which is further explained below.

The machining program is executed according to the present invention by the sequence control logic as follows. The appropriate data is written into a machining buffer B in data blocks N20 through N120. Subsequently, a sequence control management cycle MZ is started, which searches for a first cycle for operation TO1 in machining buffer B and selects this cycle as a modal cycle. Management cycle MZ then searches for the first cycle for a position element GO1 in machining buffer B and calls this cycle. The first operation TO1 is then executed on the geometry of first position element GO1 on workpiece W. Then management cycle MZ searches for the following cycle for a position element GO2 in machining buffer B and calls this cycle. First technology object TO1 is then executed on geometry GO2 of workpiece W. This principle is applied for all the other position element GO3 through GO*m* (in this case GO8) of the machining task. After the last cycle of a position element GO*m*, management cycle MZ searches for the next cycle of an operation TO2 and proceeds as previously.

When no more operations TO1–TO*n* or position elements GO1–GO*m* are available, management cycle MZ ends the last modal cycle and clears machining buffer B for the next machining task.

Figure 2:
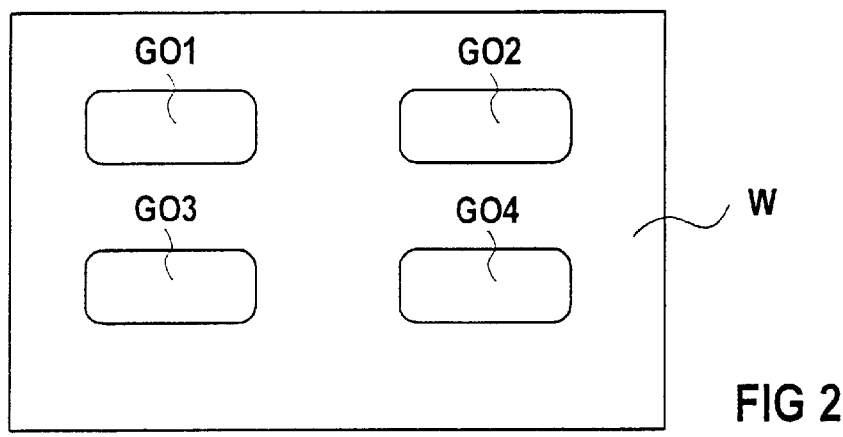
FIG. 2 shows the technological object of cutting four identical pocket holes with a roughing and a finishing tool.

FIG. 2 shows another embodiment of the present invention using the example of the technological task of cutting four identical pocket holes in a workpiece W. The pocket holes represent position elements GO1 through GO4. A roughing tool and a finishing tool are used, representing operations TO1 and TO2. The CNC machining program according to the present invention has the following aspect:

| N30 | Cycle for roughing pocket hole |
| N40 | Cycle for finishing pocket hole |
| N50 | Cycle for $1^{st}$ position |
| N60 | Cycle for $2^{nd}$ position |
| N70 | Cycle for $3^{rd}$ position |
| N80 | Cycle for $4^{th}$ position |

In addition, further optimization may be achieved by the sequence control within the numerical control according to the present invention. Cycles for position patterns can be defined as position elements. Accordingly, position elements GO1 through GO*m* can also be position patterns such as position rows (see first embodiment), position grids, position circles, or position sequences. Thus the exemplary embodiment of FIG. 1 is simplified as follows:

| N20 | Cycle for centering |
| N30 | Cycle for hole boring |
| N40 | Cycle for thread cutting |
| N50 | Cycle for $1^{st}$ row of holes |
| N60 | Cycle for $2^{nd}$ row of holes |

In addition, the method can be optimized in the tool axis. If position elements GO1 through GO*m* are located at different levels, sequence control MZ can take such position elements into account by automatically suppressing the otherwise normal return motions.

Figure 3:
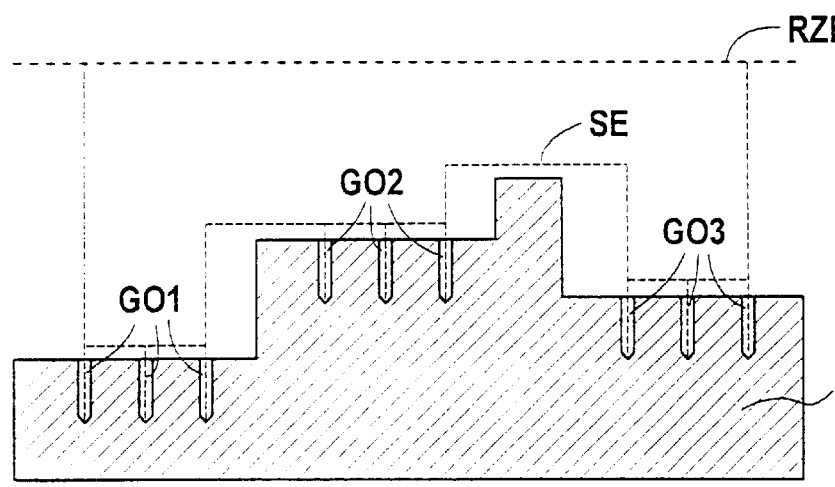
FIG. 3 shows sequence optimization in the tool axis using a workpiece having position elements of different heights.

FIG. 3 shows a tool W with position elements GO1 through GO3, which represent rows of holes. These position elements are located at different levels, which is illustrated in FIG. 3 by showing a section of workpiece W.

In principle, a global return plane RZE is provided, to which the sequence control traditionally returns the tool or which is inserted in the sequence by the programmer before a positioning motion to the following position element takes place. The novel cycle according to the present invention eliminates tool positioning and return motions, which are now unnecessary, thus further increasing productivity.

For example, traditionally a plurality of hole patterns having the same hole diameter are located at different levels, as shown in FIG. 3. Therefore, traditionally (unless the programmer explicitly states otherwise) the boring tool travels in rapid motion from return plane RZE to a safety distance from the workpiece surface. The hole pattern is machined from that position. Subsequently the tool travels back in rapid motion to a return plane RZE, travels through the new hole pattern (position element) and is positioned in rapid motion at the new safety distance. These non-productive motions are time-consuming. According to the present invention, the tool only travels once in rapid motion to the safety distance according to a safety plane SE assigned to the position element, which is shown in the figure by a dotted line over the outline of the workpiece. After machining the first hole pattern, the tool travels in rapid motion to the safety distance according to safety plane SE of the second hole pattern or position element, etc. The sequence control itself thus positions only up to the safety plane of the position element located at a higher level.

Positioning within the operations is also optimized. In operating motions within a position pattern or position element, the tool is only returned to the safety distance. Prior to changing to another position pattern or position element, it is, however, returned to the safety distance of this position pattern. At the end of this operation, it is returned again to return plane RZE.

A CNC machining program that can thus be used according to the present invention has the following aspect:

| CNC Program (principle) | |
| --- | --- |
| N20 | Cycle for centering |
| N30 | Cycle for hole boring |
| N40 | Cycle for thread cutting |
| N50 | Cycle for $1^{st}$ row of holes, height 5 mm |
| N60 | Cycle for $2^{nd}$ row of holes, height 5 mm |
| N70 | Cycle for grid of holes, height 10 mm |

The sequence control according to the present invention can also be used for optimizing other technological factors such as circumventing an obstacle.

Workpieces are often secured to the work bench using vises, so a vise may constitute an obstacle that must be circumvented. For this reason, obstacles can be introduced as position elements between position elements of a machining task. An obstacle is determined by its height (dimension along the tool axis). In executing the task, the obstacle is recognized by the sequence control and circumvented in the tool axis observing the safety distance as with reference to the embodiment of FIG. 3.

A CNC machining program thus optimized according to the present invention can have the following aspect, for example:

| CNC Program (principle) | |
| --- | --- |
| N20 | Cycle for centering |
| N30 | Cycle for hole boring |
| N50 | Cycle for $1^{st}$ position |
| N60 | Cycle for obstacle H = 50 mm |
| N70 | Cycle for $2^{nd}$ position |
| N80 | Cycle for $3^{rd}$ position |
| N90 | Cycle for obstacle H = 50 mm |
| N100 | Cycle for $4^{th}$ position |

In addition, position elements can be used multiple times. A tool is often used in several machining operations (e.g., the same centering bit is used for centering different holes). This means that position elements from other machining tasks can also be assigned to operations. For this reason, geometric elements are automatically numbered, for example, and called by their numbers from another machining task when needed. If a position element previously defined is introduced by its number, it is the same as if it were introduced directly into the machining object.

A CNC machining program thus optimized according to the present invention may have the following aspect, for example:

| CNC Program (principle) | |
|---|---|
| N20 | Cycle for centering |
| N30 001 | Cycle for 1st row of holes, height 5 mm |
| N40 002 | Cycle for 2nd row of holes, height 5 mm |
| N50 003 | Cycle for grid of holes, height 10 mm |
| N60 | Cycle for hole boring, 5.5 mm |
| N70 | "Repeat" geometry 003 |
| N80 | Cycle for boring M5 core hole |
| N90 | Cycle for thread cutting |
| N100 | "Repeat" geometry 001 |
| N110 | "Repeat" geometry 002 |

What is claimed is:

1. A numerical control arrangement, comprising:
a machining program comprising tool-related operations and position elements, the operations and position elements being associated with machining tasks; and
a sequence control using cycles, the operations and the position elements associated with each of the machining tasks being executable according to the sequence control depending on a technology-dependent sequence in the machining program, each cycle for each respective one of the operations being selected as a modal cycle, all cycles for each respective one of the position elements being selected consecutively for a machining object, each respective one of the operations taking place at a position of the respective one of the position elements prior to a following cycle being selected for one of the operations as a model cycle.

2. The numerical control arrangement according to claim 1, further comprising:
a machining buffer storing data of respective operations and position elements for each of the machining tasks.

3. The numerical control arrangement according to claim 1, wherein the sequence control operates in real time at a time the machining program is being executed.

4. The numerical control arrangement according to claim 1, wherein the position elements describe position patterns comprising one of rows, position grids, position circles and obstacles.

5. The numerical control arrangement according to claim 1, wherein returning positioning takes place only to a local safety level of one of the position elements at a higher level to avoid return motions to a global return plane for position elements located at different levels.

6. The numerical control arrangement according to claim 1, wherein the position elements are used multiple times for different ones of the machining operations.

7. The numerical control arrangement according to claim 1, wherein the numerical control arrangement provides numerical control for one of a machine tool and a robot.

8. A numerical control arrangement, comprising:
a machining program comprising tool-related operations and position elements, the operations and position elements being associated with machining tasks; and
a sequence control using cycles, the operations and the position elements associated with each of the machining tasks being executable according to the sequence control depending on a technology-dependent sequence in the machining program, wherein the cycles for each of the position elements are selected as a modal cycle and the cycles for each of the position elements are selected consecutively for a machining object.

9. The numerical control arrangement according to claim 8, wherein each of the operations take place at a position of the respective one of the position elements prior to a following cycle being selected for one of the operations as a model cycle.

10. The numerical control arrangement according to claim 8, further comprising:
a machining buffer storing data of respective operations and position elements for each of the machining tasks.

11. The numerical control arrangement according to claim 8, wherein the sequence control operates in real time at a time the machining program is being executed.

12. The numerical control arrangement according to claim 8, wherein returning positioning takes place only to a local safety level of one of the position elements at a higher level to avoid return motions to a global return plane for position elements located at different levels.

13. The numerical control arrangement according to claim 8, wherein the numerical control arrangement provides numerical control of a machine tool and a robot.

* * * * *